United States Patent [19]

Yoon

[11] 4,378,336

[45] Mar. 29, 1983

[54] MONOLITH REACTOR

[75] Inventor: Heeyoung Yoon, McMurray, Pa.

[73] Assignee: Conoco Inc., Stamford, Conn.

[21] Appl. No.: 341,946

[22] Filed: Jan. 22, 1982

Related U.S. Application Data

[63] Continuation-in-part of Ser. No. 104,987, Dec. 18, 1979, Pat. No. 4,363,787.

[51] Int. Cl.³ .............................................. B01J 8/02
[52] U.S. Cl. ............................. 422/201; 48/197 FM; 165/165; 422/220
[58] Field of Search ................ 422/198, 211, 200–202, 422/220; 165/165; 48/197 FM

[56] References Cited

U.S. PATENT DOCUMENTS

| | | |
|---|---|---|
| 1,905,719 | 4/1933 | Jaeger . |
| 1,920,800 | 8/1933 | McCausland .................... 422/201 X |
| 2,013,707 | 9/1935 | Williams . |
| 2,017,676 | 10/1935 | Girsewald et al. ............. 422/201 X |
| 2,078,949 | 5/1937 | Houdry ............................... 422/201 |
| 2,125,333 | 8/1938 | Carter .............................. 422/201 X |
| 2,209,040 | 7/1940 | Simpson et al. . |
| 2,518,270 | 8/1950 | Barr . |
| 2,594,329 | 4/1952 | Mayhew . |
| 2,655,437 | 10/1953 | Garbo . |
| 2,662,911 | 12/1953 | Dorschner et al. . |
| 2,740,803 | 4/1956 | Dorschner ...................... 422/201 X |
| 2,778,610 | 1/1957 | Bruegger . |
| 2,852,350 | 9/1958 | Kolbel et al. . |
| 2,868,627 | 1/1959 | Kolbel et al. . |
| 4,101,287 | 7/1978 | Sweed et al. .................... 165/165 X |
| 4,221,763 | 9/1980 | Greene ............................. 422/201 X |

OTHER PUBLICATIONS

"Monolithic Catalyst Favored for Methanation", Tucci & Thompson, Hydrocarbon Processing, Feb. 1979, pp. 123–126.

Primary Examiner—Richard L. Chiesa
Attorney, Agent, or Firm—Dale Lovercheck; William A. Mikesell, Jr.

[57] ABSTRACT

A reactor and the use thereof for fueling an internal combustion engine.

The reactor comprising a monolithic substrate and catalytic material, said monolithic substrate containing a plurality of substantially parallel channels, means being provided for charging a heat exchange fluid into said channels and recovering said heat exchange fluid from said channels, said monolithic substrate containing a plurality of passageways through said substrate generally parallel to said channels, said passageways being adapted to pass a reactant stream through said monolithic substrate and said passageways being larger in cross section and fewer in number than said channels, said catalytic material being supported within said passageways, as a coating on the passageway walls or as pellets.

7 Claims, 6 Drawing Figures

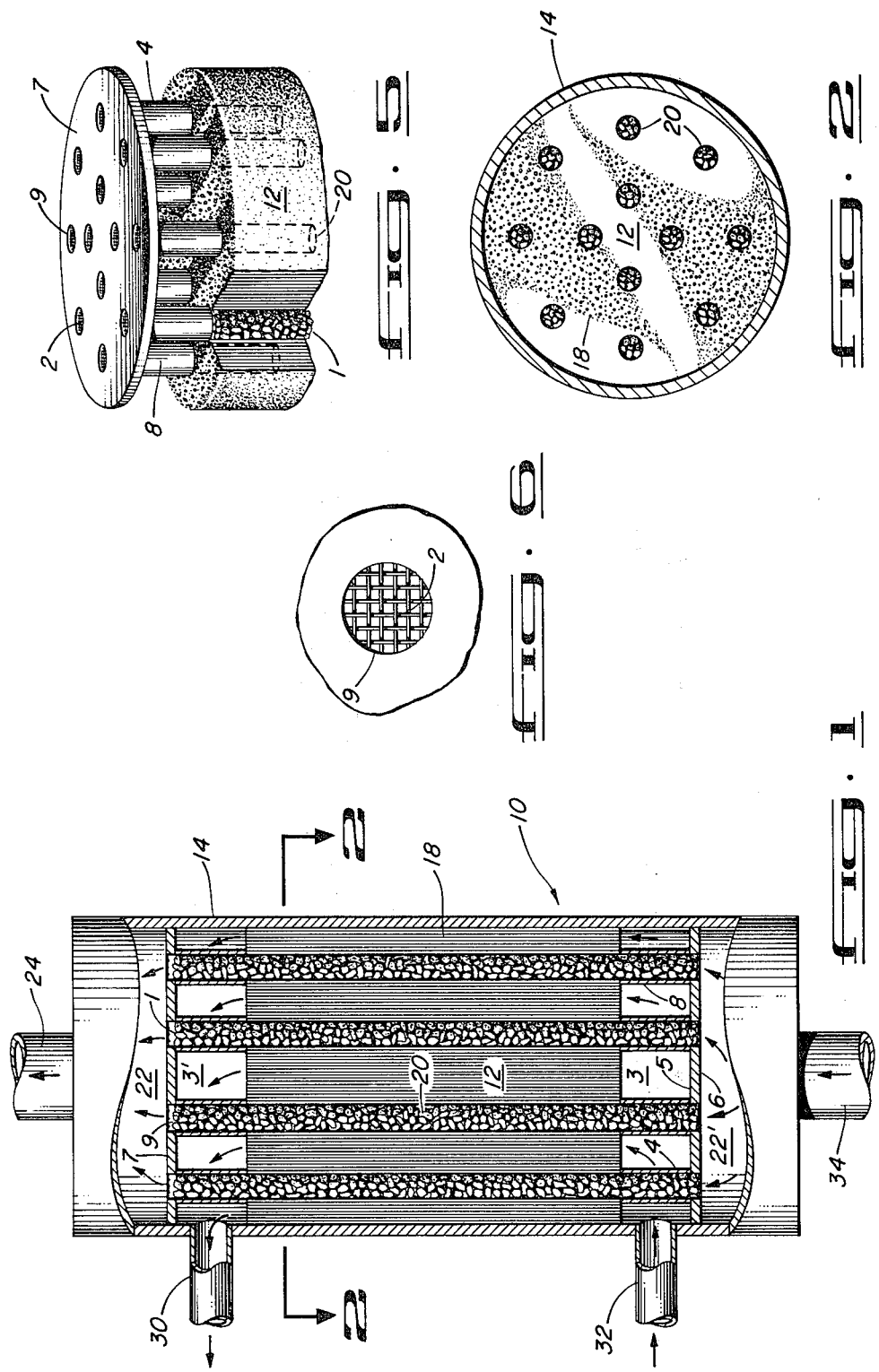

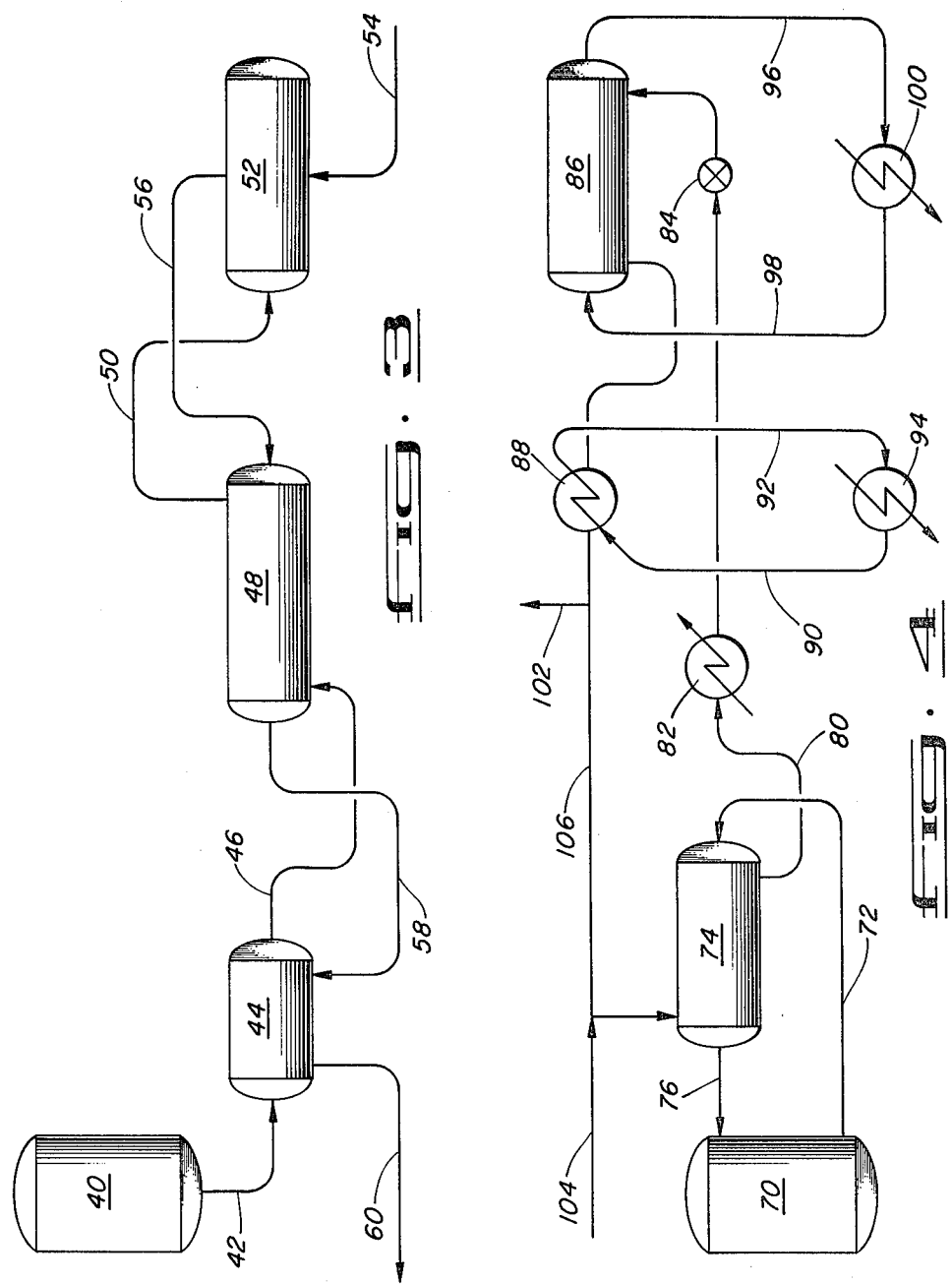

MONOLITH REACTOR

This is a continuation-in-part of U.S. Ser. No. 104,987 filed Dec. 18, 1979, and now U.S. Pat. No. 4,363,787.

This invention relates to apparatus comprising monolithic substrate reactors for use in automobiles in the on-board production of hydrogen fuel from methanol. By providing catalytic pellets in passageways through which a reactant stream is passed improved reaction conditions of increased catalyst contact area are obtained. Alternatively, where less catalyst contact area is acceptable, the passageways may have catalysts coated on the inner surface thereof. For a car fueled by hydrogen rich gaseous mixtures made on-board from catalytic reaction of methanol such catalysts as copper/zinc would be used to coat the inner surface of the passageways, or be used as the catalyst in the catalytic pellets contained and supported within the passageways.

The invention relates to a method for fueling an internal combustion engine with methanol decomposition products. This method is carried out using standard vaporizing and reacting steps whereby liquid methanol is first vaporized and then reacted over a suitable reforming catalyst such as copper/zinc to produce carbon monoxide and hydrogen. These gaseous products are then charged as fuel to the internal combustion engine. The improved method of the present invention provides for reacting the methanol in a reactor comprising a monolithic substrate containing a plurality of substantially parallel channels and a plurality of passageways positioned through said monolithic substrate substantially parallel to said channels, said passageways containing a reforming catalyst, said channels being for the passage of heat exchange fluid through said monolithic substrate to supply heat to said monolithic substrate. The heat exchange fluid is preferably fluid heated in the internal combustion engine, for example engine exhaust gases or engine coolant. The heat exchange from the channels to the passageways of the monolithic substrate provides for waste heat recovery where internal combustion engine exhaust gases are used as the heat exchange fluid. This system is particularly well suited to the endothermic dissociation of methanol to $H_2$ and $CO$ with a copper/zinc catalyst.

This invention relates to monolithic substrate reactors for use in conducting catalytic exothermic reactions.

This invention further relates to monolithic substrate reactors for conducting catalytic endothermic reactions.

This invention further relates to a monolithic substrate reactor for conducting catalytic reactions wherein heat transfer means are positioned through the monolithic substrate for the transfer of heat from the substrate or for the transfer of heat to the substrate.

For many years, a considerable amount of effort has been directed to the development of processes for converting coal and other abundantly occurring carbonaceous fuels into chemicals or synthetic natural fuels. In such processes, a final step is the conversion of a synthesis gas mixture comprising carbon monoxide and hydrogen into methane, methanol, light alkanes or the like. Many such processes are known to the art and most involve the use of catalytic vessels for the final step. Further, continuing efforts have been directed to the development of methods whereby heat may be transferred from a central heat source to a remote location such as a home, office buildings or the like economically and efficiently.

In the reaction of carbon oxides and hydrogen to produce methane for instance, a continuing problem is sulfur poisoning of the catalyst bed and the pressure drop across the catalyst bed. Further, the amount of material which may be reacted in the bed is limited, at least to some extent, by the temperature increase across the catalyst bed. It has now been found that monolithic substrates containing channels are useful in such reactions. These channels in accordance with the present invention provide a passageway for heat exchange fluid. While passageways larger in cross section and substantially parallel to said channels provide support for catalytic pellets in accordance with the present invention. The monolithic substrate may be as suggested by Sweed et al in U.S. Pat. No. 4,101,287 of a honeycomb design because of its use of mutually supporting wall design, which permits the preparation of very thin walls which would crack due to normally occurring stresses (be they mechanical thermal, or chemical) if not mutually supported, i.e. if exposed or structurally independent.

The honeycomb of channels may be fabricated from glass, ceramics or metals or combinations thereof. The ceramic material may be selected from the group consisting of mullite ($Al_6Si_2O_{10}$), cordierite ($Mg_2Al_4Si_5O_{18}$), alumina, silica, silicon carbide, silicon nitride, alkaline earth oxides, transition metal oxides, mixtures thereof, and glass. The metal may be selected from the group consisting of nickle, stainless steel, iron, aluminum, copper, titanium, alloys and mixtures thereof. The glass material may be selected from a group consisting of fused silica, flint glass, soda lime glass, alumino silicate glass, borosilicate glass, and mixtures thereof. An article describing the use of such monolithic substrates in such reactions is "Monolithic Catalyst Favored for Methanation", Tucci and Thompson, Hydrocarbon Processing, February 1979, pp. 123–126. In this article, which is hereby incorporated by reference, the use of catalyzed metal and ceramic monoliths for the reaction of carbon monoxide and hydrogen to produce methane is discussed.

It has now been found that an improvement in such reactors is accomplished by an improvement comprising positioning a plurality of passageways through the monolithic substrate generally parallel to the channels positioned through the monolithic substrate with the passageways being adapted to pass a heat exchange fluid through the monolithic substrate.

SUMMARY OF THE INVENTION

A reactor comprising a monolithic substrate and fluid distribution means, said monolithic substrate containing a plurality of substantially parallel channels completely through said monolithic substrate, and a plurality of passageways completely through said monolithic substrate generally parallel to said channels, said passageways being larger in cross-section and fewer in number than said channels, said passageways having catalytic material supported thereby, said distribution means comprising a plurality of passageway extensions parallel to said passageways and each said extension extending coaxially from a passageway and opening into a header chamber having a header chamber outlet, said header chamber outlet being in fluid flow communication with each of said passageways, said channels opening into a product chamber, said product chamber having a product outlet in fluid flow communication with each said passageway, said channels having channel walls and said passageways having passageway walls, said channel walls being integral with said passageway walls, each said passageway extension being connected to one of said passageways, each said passageway wall being mutually supporting with at least one said channel wall, and each said channel wall being mutually supporting with at least one other channel wall.

BRIEF DESCRIPTION OF THE DRAWINGS

FIG. 1 shows an embodiment of the present invention;

FIG. 2 is a cross-sectional view of the embodiment of the apparatus of the present invention shown in FIG. 1 taken along line 2—2;

FIG. 3 is a schematic diagram of a process wherein the improved reactor of the present invention is useful; and FIG. 4 is a schematic diagram of another process wherein the improved reactor of the present invention is useful.

FIG. 5 is a perspective view of a preferred gas distributor for use in accordance with the invention.

FIG. 6 is a partial top view of a preferred gas distributor.

DETAILED DESCRIPTION OF THE INVENTION

In the description of the Figures the same numbers will be used to refer to the same or similar components throughout.

In FIG. 1, the improved reactor 10 of the present invention is shown. The reactor 10 comprises a casing 14 containing a monolithic substrate 12 which contains a plurality of small channels 18 as commonly used in such monolithic substrates. The channels 18 are positioned generally parallel through the substrate 12 with openings at each end of the substrate 12. The passageways 20 may contain catalytic pellets 1. Alternatively, the walls of passageways 20 may be coated with catalyst. By the improvement of the present invention the plurality of channels 18 are positioned through the substrate 12 for the passage of a heat exchange fluid therethrough. As shown in FIG. 1, the heat exchange fluid flows through channels 18 and is recovered via outlet 30. The channels 18 may have catalyst material therein, for example as a coating on the channel wall. This catalyst material may be selected to reduce pollutants in the heat exchange fluid. For example when the heat exchange fluid is exhaust gas from the engine. The heat exchange fluid is introduced through a similar arrangement via a heat exchange fluid inlet 32. The reaction products are removed via a product outlet 24. The outlet 30 is positioned on one end of casing 14 to receive the heat exchange fluid flowing through the channels 18 into casing 14. Similarly, the reactants are passed into passageways 20 via a reactant inlet 34. Clearly a variety of means for charging the reactants to the passageways 20 are known to the art and such means are suitable so long as substantially even flow is accomplished across the cross sectional area of substrate 12. Similarly a variety of gas distributor header means 7 can be used to recover the flow through passageways 20 for discharge through header chamber outlet 24. Under the use of the improved reactor of the present invention, a reactant stream is charged to one end of substrate 12 via inlet 34 and passed therethrough under suitable reaction conditions to produce a product stream which is removed from the other end of substrate 12 via outlet 24. A heat exchange fluid is injected via heat exchange fluid inlet 32, passed through substrate 12 and recovered via outlet 30 to accomplish heat transfer in substrate 12. As shown in FIG. 1, the heat exchange fluid flows cocurrently with the reactants. In most instances it is anticipated that counter-current flow will be used although either type of flow was in the scope of the present invention.

FIG. 2 is a cross-sectional view of the improved reactor of the present invention as shown in FIG. 1. FIG. 2 shows the small channels 18 positioned through substrate 12 and the passageways 20, positioned through substrate 12. As will be apparent, many more channels are present in substrate 12 than the number of passageways 20. Further, passageways 20 are considerably larger than channels 18. Channels 18 can be of any suitable configuration such as square, rectangular, round, triangular, etc. The configuration is normally chosen for convenience in fabrication or the like. The configuration of channels 18 is considered to be variable by those skilled in the art. Passageways 20 can also be of any suitable configurations.

In the fabrication of the improved reactor of the present invention, passageways 20 may be positioned through substrate 12 by drilling, by forming during the monolith substrate production process or the like. Further, conduits 20 may be formed with an extension from the ends of substrate 12 to permit the recovery of flow from passageways 20 or sleeves or the like may be sealingly positioned in the inlets and outlets of passageways 20. Further, tubular materials such as copper or the like could be used to extend through the entire length of substrate 12 to form passageways 20. The pellets 1 are then supported by the tubular element not shown. The particular method of fabrication may vary and any method of fabrication which results in the positioning of passageways 20 through substrate 12 for the flow of a reactant stream is considered suitable.

As shown in FIGS. 5 and 6 the gas distributor header means 7 may be of a disc shape with tubular passageway extensions 8 extending therefrom. To support the pellets of catalytic material 1 within the passageways 20 a screen 2 is provided for each passageway extension opening 9. These are as shown in FIGS. 5 and 6. The gas distributor header means 7 has passageway extensions 8 each having an outer cylindrical wall 4.

The reactor 10 is symmetrical in that the same gas distribution header means is used on the inlet and outlet ends. Gas entering through heat exchange fluid inlet 32 passes into the heat exchange distribution fluid inlet chamber 3. The heat exchange fluid distribution inlet chamber 3 is defined by the cylindrical walls or of the passageway extensions 8 and the gas distributor plate reactor side wall 5. The gas distributor header has reactant inlet side wall 6. The reactant inlet side wall 6 forms a reactant inlet distribution chamber 22' with the inside wall of the casing 14. Reactant material entering through reactant inlet 34 passes into the passageway extensions 8 and continues on therethrough into the passageways 20. At the outlet end of the passageways 20 the gas again enters the passageway extensions 8. From the passageway extensions 8 the gas which has reacted over the catalytic material within the passageways then enters the header chamber 22 before passing out of the product outlet 24.

The heat exchange fluid entering through the exchange fluid inlet 32 enters the chamber 3 and from there passes into and through the channels 18 into the chambers 3' wherein the heat exchange gaseous fluid collects and passes into the outlet 30.

FIG. 3 is a schematic diagram of a process wherein the improved reactor of the present invention is considered useful. A methanol storage 30 is shown with a line 42 being positioned for the withdrawal of methanol therefrom. The methanol is typically liquid and is passed to a heat exchanger 44 where the methanol is vaporized and discharged as a vapor through a line 46 to a reactor 48, such as the improved reactor of the present invention, where the methanol is dissociated over a suitable reforming catalyst such as a copper/zinc base catalyst to produce hydrogen and carbon monoxide which are recovered through a line 50 and passed to a suitable combustion engine 52 where the carbon monoxide and hydrogen are combusted. A free-oxygen containing stream is injected into engine 52 via a line 54 with the exhaust stream from engine 52 being recovered via a line 56 and passed back through reactor 48 as a heat exchange fluid where it provides the heat required by the endothermic dissociation reaction of methanol into carbon monoxide and hydrogen. The exhaust stream is then recovered via a line 58 and passed to further heat exchange with the liquid methanol in heat exchanger 44 after which it is discharged via a line 60. The reactor of the present invention is considered to be particularly suitable for such applications since it results in a relatively low pressure drop and since it is readily adapted to the use of heat exchange fluids.

FIG. 4 is a schematic diagram of a further process in which the improved reactor of the present invention is useful. A heat source 70, which may be a carbonaceous fuel-fired plant, a nuclear reactor facility or the like, produces a heated stream which is discharged through a line 72 and passed to heat exchange with a reactant stream in a reactor 74 which is optionally of the type discussed above. The heat exchange fluid is recovered through a line 76 and passed back to plant 70 for reheating and the like. A suitable reactant stream charged to reactor 74 comprises methane and water. At least a portion of the water is added through a line 104. In reactor 74, the methane is at least partially reformed into carbon monoxide and hydrogen over a suitable reforming catalyst such as those disclosed in U.S. Pat. No. 4,017,274. The resulting stream, comprising carbon monoxide, hydrogen and optionally some methane, is passed via a line 80 through a heat exchanger 82 and to a remote location where it is reacted in a second reactor 86, which is optionally of the type discussed, to produce methane. The reaction conditions in reactor 86 are those known to the art for the production of methane and the catalyst used is a methanation catalyst. Such catalysts are considered to be well known to those skilled in the art as shown for instance in U.S. Pat. No. 3,890,113. The resulting product stream comprising methane is passed via a line 106 through a heat exchanger 88 and back to reactor 74. In most instances it will be desirable to remove quantities of condensed water from line 106 downstream of heat exchanger 88 via a line 102. The water removed via line 102 will be substantially equivalent to that added via line 104 but since transportation over lone distances is contemplated, it is undesirable that the water remain in the pipeline system. In the practice of the embodiment shown, heat from the power plant 70 is transferable over long distances via the closed system including reactors 74 and 86 which absorb heat via the chemical reactions occurring in reactor 74 with the heat being released in reactor 86 via the reactions occurring therein. Desirably, a heat exchanger fluid is used to remove heat from reactor 86 with the heat exchange fluid being injected via a line 98 and recovered via a line 96 with heat being removed from the circulating heat exchange fluid via a heat exchanger 100. As will be noted in the embodiment shown in FIG. 4 the heat exchange fluid flows counter-currently to the reactant stream. In the event that sufficient quantities of heat are not removed from the reaction zone in reactor 86, heat exchanger 88 is positioned to remove additional heat from the product gaseous stream with the heat being recovered by a heat exchange fluid injected via a line 90 and recovered via a line 92 with the heat being recovered from the circulating heat exchange fluid via a heat exchanger 94. By the use of the apparatus shown, heat is readily transferred from heat source 70 to a remote location where the heat is released at a desired location which may be an office building, a home or the like, wherein reactor 86 is positioned. It may not be necessary to include a heat exchanger such as heat exchanger 88 in the event that heat is effectively removed to the desired levels from reactor 86. Desirably flow to reactor 86 is controlled by a valve 84 to provide heat as required. Further, it is necessary that the flow rate to reactor 86 be controlled within reasonable limits to avoid damaging the catalyst etc. It will be noted that the process disclosed does not utilize streams in the catalytic reaction systems which contain contaminants. In other words, the system operates as a closed loop with the reactants being reacted repeatedly so that the addition of materials which would poison, contaminate or otherwise inactivate the catalyst surfaces is eliminated. By such a process heat is readily transferred from a central power source to a remote location.

The use of monolithic substrates as discussed herein is considered to be known to those skilled in the art as discussed, for instance, in the reference cited previously. The use of heat exchange means positioned in the monolithic substrate has not been known to the art heretofore to Applicant's knowledge. By the use of such heat exchange means, the efficiency of the catalyzed metal or ceramic monolith is greatly improved since the heat is removed from the substrate itself rather than through the casing or the like. The use of such monolithic substrates results in the ability to use high flow rates through the catalyst with relatively low pressure drops. Pressure drops much lower than those typically encountered with the use of fixed beds or fluidized beds are achieved. The fabrication of such monolithic substrates is well known to those in the art. As discussed in the article, monoliths having 400 to 600 cells per square inch are well known, although, as indicated previously, the particular monolith used is not considered to constitute a part of the present invention.

Having thus described the present invention by reference to certain of its preferred embodiments, it is pointed out that the embodiments discussed are illustrative rather than limiting in nature, and that many variations and modifications are possible within the scope of the present invention. Many such variations and modifications may be considered obvious and desirable by those skilled in the art based upon a review of the foregoing description of preferred embodiments.

Having thus described the invention, I claim:

1. A reactor comprising
a monolithic substrate and fluid distribution means,
said monolithic substrate containing a plurality of substantially parallel channels completely through said monolithic substrate, and a plurality of passageways completely through said monolithic substrate generally parallel to said channels, said passageways being larger in cross-section and fewer in number than said channels, said passageways having catalytic material supported thereby,
said distribution means comprising a plurality of passageway extension parallel to said passageways and each said extension extending coaxially from a passageway and opening into a header chamber having a header chamber outlet, said header chamber outlet being in fluid flow communication with each of said passageways, said channels having channel walls and said passageways having passageway walls, said channel walls being integral with said passageway walls, each said passageway extension being connected to one of said passageways, each said passageway wall being mutually supporting with at least one said channel wall, and each said channel wall being mutually supporting with at least one other channel wall.

2. The reactor of claim 1 wherein said passageways open into a reactant inlet distribution chamber, said reactant inlet distribution chamber having a product inlet in fluid flow communication with each said passageway.

3. The reactor of claim 1 wherein said catalytic material is provided in the form of pellets.

4. The reactor of claim 3 wherein said passageways are formed in said monolithic substrate.

5. The reactor of claim 2 wherein said passageways comprise tube means positioned through said substrate.

6. The reactor of claim 1 wherein said catalytic material is coated on the surfaces of said passageways.

7. The reactor of claim 6 wherein catalytic material is supported within said channels.

* * * * *